Figure 1:
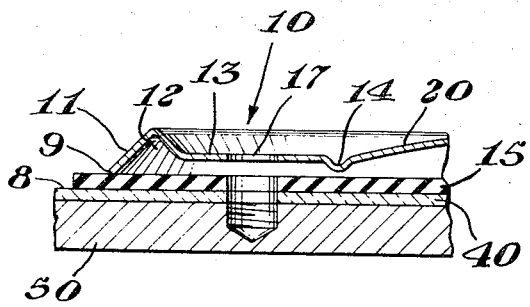

Feb. 20, 1968 R. B. CHASE 3,369,693
LINER PATCH
Filed March 3, 1966

INVENTOR.
Raymond Burt Chase
BY

*Griswold & Burdick*
ATTORNEYS

United States Patent Office 3,369,693
Patented Feb. 20, 1968

3,369,693
LINER PATCH
Raymond Burt Chase, Midland, Mich., assignor to The Dow Chemical Company, Midland, Mich., a corporation of Delaware
Filed Mar. 3, 1966, Ser. No. 531,474
1 Claim. (Cl. 220—63)

The present invention is concerned with the shaping of a metal article and is particularly directed to a new and improved shape for a tantalum patch.

It is known, in the repair of glass lined reactor and storage vessels used in the chemical industry, that tantalum is commonly the metal of choice by reason of various properties including its extremely low chemical reactivity. As usually employed, a tantalum patch is applied over an underlying resin filler and at its edges engages a gasket which should be of a resinous semi-rigid slightly deformable substance also highly resistant to chemical activity. Polytetrafluoroethylene is commonly a gasket material of choice.

The permanence of a patch depends upon various factors, but assuming the use of the preferred substances throughout, the permanence of a patch commonly depends upon the integrity of the seal between the tantalum metal cover and the underlying resinous gasket. It is highly desired that this seal be not only chemically sound, as is effected by the employment of a resinous filler, but mechanically as strong as possible.

The peculiar and unique nature of the metal tantalum makes it difficult to work. Casting it into desired shapes is usually impractical in view of its extremely high melting temperature. It is very susceptible to "galling," that is to say, the development of minute cleavages often shallow at and under a point of deformative pressure. Thus, while certain metals including certain sheet steels, brasses and the like can easily be formed by die stamping or drawing or spinning into relatively complicated shapes with little or no danger of fracture, tantalum can be worked in this way in only a minimal extent. As the expression is used herein, tantalum has little "draw": that is, ability to be shaped as by stretching and the like. Moreover, whereas most metals soften and become readily workable by elevation of the working temperature, tantalum becomes more difficult to work with and more easily galled and broken when worked at elevated temperatures. Whereas many metals, if work hardened, can be annealed with heat, tantalum is not thus annealed. All operations of working with and upon sheet tantalum are beset with limitations and difficulties not known to pertain to any other metal that is in general industrial use.

Making use of essentially all the "draw" available from sheet tantalum it is known to prepare a tantalum patch cover near the outer periphery of which are parallel peripheral ridges projecting from the tantalum metal face toward the exposed face of the gasket with which it is to engage. These are provided to enhance the rigidity of the sheet tantalum and to increase its purchase, that is to say, its embedment by pressure deforming, of the gasket material. In typical use known to the prior art, between the circumferential essentially parallel ridges there are provided holes through which pass studs which are in turn engaged by nuts which are secured against the face of the tantalum, forcing the said ridges into deforming contact with the gasket beneath. This structure suffers the disadvantage, however, that any tendency on the part of the nut attached to and cooperating with the stud to deform the tantalum by downward pressure tends to be accompanied by a tendency to elevate at least the outer and not rarely both outer and inner ridges away from the resinous gasket surface.

According to the present invention there is provided a new shape which is especially adapted to be employed with sheet tantalum because forming it of sheet tantalum does not require working the tantalum beyond its draw, and because also it provides a shape structure which avoids the prior art difficulty of elevating the engaging ridges from the underlying gasket.

Figure 2:
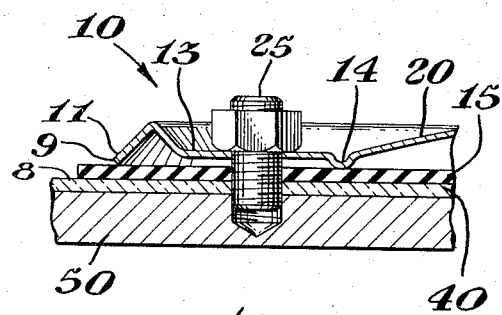
Figure 3:
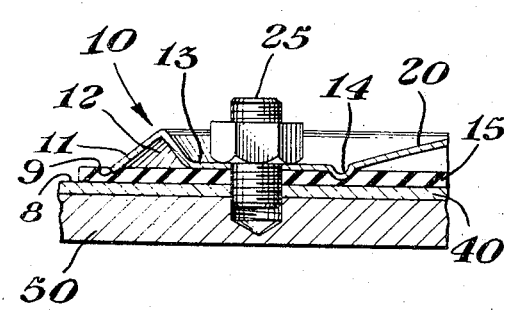

The patch flange of the present invention will be more readily understood by reference to the annexed drawing. FIGURES 1, 2, and 3 illustrate in section, the flange 10, of the present invention as the edge extremity of a tantalum cover, 20, over a break (not shown) in the wall of a reactor vessel, the said wall comprising a glass lining, 40, applied to a substantial metal wall, typically a steel wall 50.

The flange of the present invention is characterized in that it presents a composite working face which faces toward and cooperates with an underlying moderately deformable chemically resistant resinous gasket as is known in the prior art. The working face of the said flange comprises a first edge substantially at the outer periphery of the said patch, a wall proceeding from the said edge away from the said gasket at an acute included angle, stopping and returning toward the said gasket at a returning acute included angle, the two said acute angles defining an outer apical groove; the rise of the wall defined along the returning acute angle being shorter than the rise of the wall proceeding along the departing acute angle; the said flange proceeding from the base of the said returning wall substantially parallel to the face of the said gasket for a distance sufficient to admit of drilling to pass a stud and receive a nut and thereafter returning at an obtuse included angle again toward the said gasket to a point which, when not stressed, is farther from the said gasket than the first said edge; and thereafter departing away from the said gasket, at a departing obtuse angle, the two said obtuse angles defining an inverted apical groove, the said patch wall then proceeding along a surface which intergrades between the said inverted apical groove and a central portion of the said patch.

In use, the patch is routinely applied over a mass of deformable, curable, resin filler; through the provided stud holes in the flat of the said flange studs are screwed into threaded holes drilled and tapped into the steel wall underlying the glass liner of the said vessel, threaded cooperating nuts (preferably in an "upside down" position) for better purchase are mounted upon and screwed down upon the said studs, the said nuts being screwed tightly enough first to secure the inner inverted apical ridge against the said gasket, and, by the leverage with the said ridge as fulcrum to subsequently force the first said outer edge also into deforming engagement with the said gasket.

According to the present invention it has been discovered that tantalum can be formed into the composite flange shape here defined, by two passes through a groove-forming sheet metal shaping machine, one in obverse and the other in reverse position with respect thereto; and that in such operation the tantalum not only is not stressed to the point of incipient fracture but that it retains elasticity, distributed primarily between the said outer apical groove and the said inner inverted apical groove, and therefrom to the interior area of the said patch, sufficient that, when applied as here indicated, this elesticity admits of substantial flexure of the tantalum patch into a secure "biting" engagement into, and with deforming of, the said gasket.

Tantalum patches provided with flanges according to the present invention have been tested under actual use conditions and have been found, especially when carefully formed and constructed with an umbo central to the said patch, almost completely to obviate any problem of lifting of the edge of the tantalum patch, or leakage or admission of chemical reactor vessel contents under the tantalum patch. Moreover, the crimp edge shape of a tantalum patch of the present invention provides flexure of the tantalum sufficient that precise forming of the tantalum is of less critical necessity than in the forming of patches hitherto known. Minor irregularities in the edge of the tantalum tend to disappear as stud nuts are tightened with flexure as hereinbefore described, of the edge patch crimp of the present invention.

Referring, now, more particularly to the drawing, in FIGURE 1 the crimp of the present invention is shown as at the edge of an umbonate tantalum patch. It is to be assumed that the patch is employed in accordance with good industrial practice in this art, and that such matters as curable filler resins, proper machining of a break to be repaired, and the like are adequately attended; they are not illustrated or further discussed here as being no part of the present invention. In FIGURE 1, there is shown, in section, the edge of a tantalum patch displaying the edge crimp in the flange, 10, of the present invention, in place over a gasket 15 and against a wall surface 8 near a site to be repaired. It is assumed that the flange, 10, will cooperate with gasket 15 disposed in essentially the manner here shown; it is immaterial to the present invention whether a gasket be circumferential only or a full face structure.

With particular reference to FIGURE 1, it will be noted that the flange of the present patch comprises a first edge, 9, at substantially the outer periphery of the said patch, a wall 11 departing from the said edge away from the said gasket 15 at an acute included angle, stopping and returning toward the said gasket at a returning acute included angle, the rise of the wall of the patch flange defined along the returning acute angle being shorter than the rise of the wall defined along the departing acute angle, the walls at two said angles defining an outer apical groove 12. The patch wall, 13, proceeds from the base of the returning wall of the outer apical groove 12, substantially parallel to the face of the gasket and of the surface to be patched, for a distance sufficient to admit of drilling holes 17 to pass a stud and receive the face of a nut (here shown together as 25) thereupon, thereafter proceeds at an obtuse included angle again toward the said gasket to, and stopping at a line which, when the cover is not stressed, is farther from the said gasket than the first said edge 9, and thereafter returns away from the said gasket at an obtuse included angle, the two said obtuse angles defining an inverted second apical groove 14 from which the wall of the said patch proceeds to a central portion, 20, of the said patch.

FIGURE 2 illustrates the same structure except that a stud and a cooperating nut, together numbered 25, have been affixed within the prepared stud hole 17, and tightened sufficiently to effect partial flexure of the patch of the present invention and to bring to impinge upon the gasket of the patch the outer edge 9 and the inner inverted apical groove 14. Depending upon the properties of gasket 15, incipient gasket deformation, a desired effect, may be manifest.

FIGURE 3 illustrates the same structure of the present invention as FIGURES 1 and 2, but with the stud nut tightened into essentially its final position, illustrating that, with the use of inverted apical groove 14 as fulcrum, the pressure applied by the stud nut through face 13 of the tantalum patch has effected desirable and significant conforming deformation of gasket 15 at both outer edge 9 and at inner apical groove 14, whereby, especially in cooperation with the usually employed curable resinous filler, not here shown, there is effected a seal which is not only of extraordinary permanence and security but is adapted to be effected with a tantalum patch without seriously weakening the tantalum in the forming process.

The present inventor knows of no other shape for the peripheral flange of a patch made expressly of tantalum with its well known galling and work-weakening properties, which similarly admits of an attachment so secure.

Figure 4:
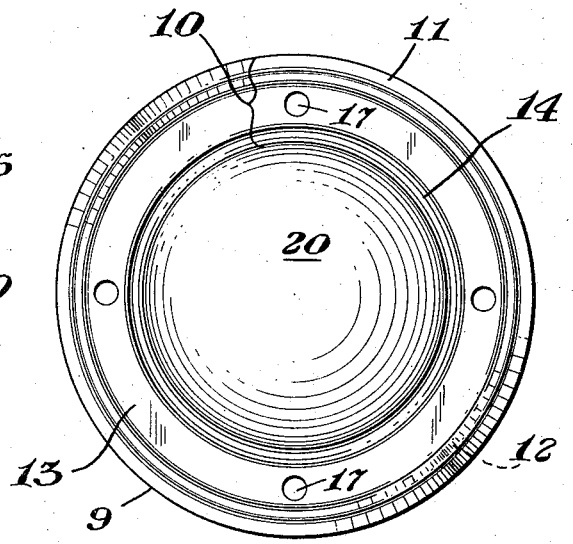

While the present invention is in the flange, 10, of the patch, FIGURE 4 illustrates, in plan, one simple representative patch with the flange, 10, defining its periphery. As in FIGURES 1–3, the patch of tantalum is intended to overlie a gasket. Outer edge 9, of the patch, and its peripheral apical groove 12, are shown disposed about the essentially flat area 13 with holes 17 for studs to cooperate with stud nuts, not shown. Within this area 13 is shown inverted apical groove 14, from which the patch proceeds to central area 20. While circular patches are common and are useful, the present invention is in no way restricted to patches of circular outline. As is well known in the art of patching glass reactor vessel linings, the patch of the present invention can be shaped in any desired way substantially to conform to and to cover a break in a reactor vessel lining. It is to be noted that conventional sheet metal forming equipment used in the forming of grooves readily follows shapes especially cut to be adapted to cover patches of substantially any outline.

I claim:
1. In a tantalum patch intended to be used to cover a resin-filled break in a glass lining of a glass-lined metal vessel, the said cover cooperating with a deformable gasket between the said cover and the said glass lining, a flange which presents a composite working surface comprising a first edge substantially at the outer periphery of the said tantalum patch, a wall proceeding away from the said edge away from the surface to be patched at an acute included angle, stopping and returning towards the said surface to be patched at a returning acute included angle, the two said acute angles defining an outer apical groove; the rise of the wall of the said patch flange defined along the returning acute angle being shorter than the wall defined along the departing acute angle; the said patch flange proceeding from the base of the said returning wall substantially parallel to the face of the surface to be patched for a distance sufficient to admit of drilling to pass a stud and receive a nut and thereafter returning at an obtuse included angle again toward the said surface to be patched to a point which, when not stressed, is farther from the said surface to be patched than the first said edge; and thereafter departing from the surface to be patched at a departing obtuse angle, the two said obtuse angles defining an inverted apical groove, the said patch wall proceeding along a surface which intergrades thereafter between the said inverted apical groove and a central portion of the said patch.

References Cited
UNITED STATES PATENTS

| | | | |
|---|---|---|---|
| 2,833,631 | 5/1958 | Rassheim et al. | 220—63 XR |
| 3,236,407 | 2/1966 | Zelman et al. | 220—24 |
| 3,281,226 | 10/1966 | Tisinai | 65—59 |

THERON E. CONDON, *Primary Examiner.*

G. T. HALL, *Assistant Examiner.*